United States Patent

Engelhart

[15] 3,682,945
[45] Aug. 8, 1972

[54] CERTAIN 2-ACYLAMINO-4,5,6,7-TETRAHYDROBENZOTHIAZOLES

[72] Inventor: John E. Engelhart, Westfield, N.J.
[73] Assignee: Esso Research and Engineering Company
[22] Filed: June 12, 1969
[21] Appl. No.: 832,809

Related U.S. Application Data

[63] Continuation-in-part of Ser. No. 742,526, July 5, 1968, abandoned.

[52] U.S. Cl. ......... 260/306.8 F, 71/90, 260/306.8 R, 260/307 D, 260/307 R
[51] Int. Cl. ......................................... C07d 91/42
[58] Field of Search ......... 260/302 F, 306.8, 306.8 F

[56] References Cited

UNITED STATES PATENTS 2,886,565  5/1959  Prager et al. ........... 260/302 F
2,940,979  6/1960  Sprague ................. 260/302 F

*Primary Examiner*—Alex Mazel
*Assistant Examiner*—R. J. Gallagher
*Attorney*—Chasan and Sinnock and Michael Conner

[57] ABSTRACT

Nitrogen-containing derivatives of 4,5-disubstituted 2-amino thiazoles and oxazoles, particularly the amides, ureas, thioureas, carbamates, thiocarbamates, dithiocarbamtaes, biurets, thiobiurets, dithiobiurets, semicarbazides, thiosemicarbazides, and imides, etc. of 4,5-disubstituted 2-amino thiazoles and oxazoles of the general formulas:

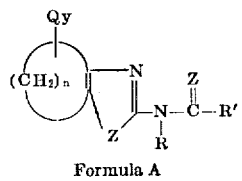

Formula A

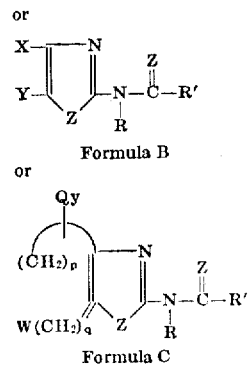

Formula B or

Formula C are useful as pesticides, especially as post-emergence herbicides. In all of these formulas, Z is independently O or S. In Formula A, $n$ is a positive integer of from 2–30; $y$ ranges from 0 to complete substitution of the hydrogen atoms present in the cycloalkyl ring, more preferably from 0 to 6 as when $n$ is 4; and Q, R, and R' can be hydrogen, or a wide variety of unsubstituted and substituted hydrocarbyl moieties. R' can also be hydrazino; $C_1$ to $C_{20}$ mono-, di-, or trialkylhydrazino; or substituted forms of these. Q can also be one or more of a number of groups such as, e.g., cyano, halogen, nitro, carboxy, carbalkoxy, perfluoroalkyl, thiocyano, alkyl sulfoxide, alkyl sulfone, hydroxy, thiol, sulfonic acid, sulfonamide, etc.
Concerning Formula B: R and R' are as in Formula A and either X or Y therein can be $C_3$ to $C_{30}$ cycloalkyl except that when one of them is $C_3$ to $C_{30}$ cycloalkyl the other is, e.g., halogen, nitro, thiocyano, hydrogen, or substituted or unsubstituted $C_1$ to $C_{15}$ aliphatic, etc. When the compounds of Formula B are used as herbicides, X and Y therein can either or both be a wide variety of substituted or unsubstituted hydrocarbyl moieties.

In Formula C, $p$ and $q$ are positive integers of from 1 to 12; W is a hetero atom such as O, $S(O)_n$ where $n$ equals 0 to 2 or N—Q, Q, y R, Z and R' are as in Formula A.

5 Claims, No Drawings

CERTAIN 2-ACYLAMINO-4,5,6,7-TETRAHYDROBENZOTHIAZOLES

CROSS-REFERENCE TO OTHER APPLICATIONS

This application is a continuation-in-part of copending application Ser. No. 742,526, filed July 5, 1968, in the name of John E. Engelhart now abandoned.

1. Field of the Invention

This invention relates to novel disubstituted amino thiazole and oxazole derivatives and their use as pesticides. More particularly, this invention relates to novel 4,5-disubstituted 2-amino thiazole and oxazole derivatives, both cyclic and acyclic with respect to the 4,5-disubstitution, and the amides, ureas, thioureas, carbamates, dithiocarbamates, thiocarbamates, biurets, thiobiurets, dithiobiurets, semicarbazides, thiosemicarbazides, and imides thereof, formulations or compositions of all of such thiazoles and oxazoles and their use as pesticides, particularly as post-emergence herbicides.

2. Prior Art

A large number of thiazoles and thiazole derivatives are known in the art and disclosed to have biological activity. For example in Netherlands Appl. 6,615,037 compounds of the formula:

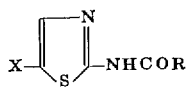

where X is a halogen such as Cl, Br, I, etc.; R is cyclopropyl or propyl, optionally substituted by 1 to 3 Cl, methoxy, methylthio, etc. groups; are used as pre- and post-emergence herbicides. Similarly, Japanese Patent 8797/67 discloses compounds of the same foregoing general formula wherein X is chlorine, bromine or thiocyano and R is $C_2$–$C_7$ straight or branched alkyl, which compounds are used as bactericides for rice leaf spot.

Disubstituted thiazoles are disclosed in Belgium Patent 677,595 where compounds of the formula

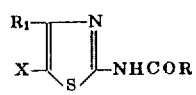

where R is an aliphatic group, preferably having from two to five carbon atoms; $R_1$ is hydrogen, halogen, $C_1$–$C_3$ alkyl, substituted by one or more halogen atoms; and X is Cl, Br or I; are disclosed to be useful as both pre- and post-emergence herbicides.

A number of 2-aminothiazoles and thiazole derivatives are, moreover, known in the literature. For example, compounds of the formulas:

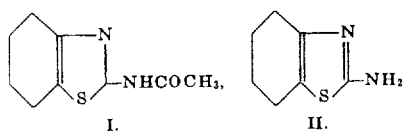

and

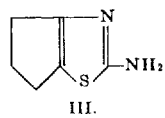

are known. These compounds are disclosed in the following literature publications: For example, compounds such as I, e.g., are disclosed in C. D. Hurd and H. L. Wehrmeister, J. Am. Chem. Soc. 71, 4007 (1949);

compounds such as II are disclosed, e.g., in J. M. Sprague and L. W. Kissinger, J. Am. Chem. Soc. 63, 578 (1941); and compounds such as III are disclosed, e.g., in H. Erlenmeyer and W. Schoenauer, Helv. Chim. Acta, 24, 172 (1941).

Likewise there are a number of non-cyclic, 4,5-disubstituted-2-amino thiazole amides that have been reported in the literature. For example, compounds of the formula

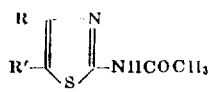

where R, R' are various alkyl or aryl groups, are known and have been reported, e.g., in the following literature references:

R. L. Huang, J. Chem. Soc. 1957, 2528;

Yoshio Tashika, Yakugaku Zasshi 81, 1444 (1961) C. A. 56, 8700b; and

J. Metzger & B. Koether, Bull. Soc. Chim. France, 1953, 702.

However, none of the prior literature references have been cognizant heretofore of compounds of the following formulas and their biological activity.

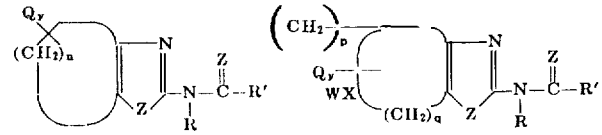

SUMMARY OF THE INVENTION

In general, the novel thiazole and oxazole derivatives of this invention are characterized by the formulas:

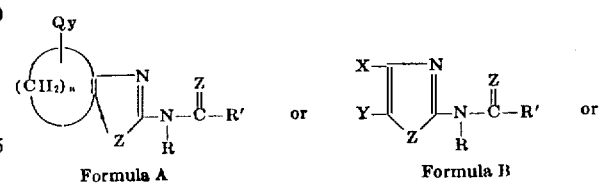

Formula A    Formula B

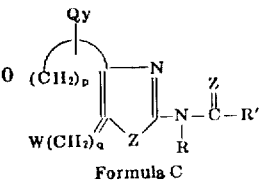

Formula C where Z can be O or S in either Formula A or B or C.

Q, R, and R', in Formula A, together can be represented by two major embodiments. In one embodiment, Q, R, and R' can be one or more of the following: hydrogen; $C_1$ through $C_{15}$ alkyl; $C_3$ through $C_{30}$ cycloalkyl; $C_1$ through $C_{20}$ alkoxy; $C_3$ through $C_{30}$ cycloalkoxy, $C_1$ through $C_{20}$ thioalkoxy; amino; $C_3$ through $C_{30}$ Cycloalkylamino; $C_3$ through $C_{20}$ polymethyleneamine; $C_1$ through $C_{10}$ alkylamino; $C$–$C_{10}$ alkoxyamino; $C_2$–$C_{20}$ alkoxyalkylamino; $C_2$ through $C_{20}$ dialkylamino; $C_6$ through $C_{30}$ dicycloalkylamino, etc. Each of the foregoing alkyl or cycloalkyl groups can be substituted with olefinic or acetylenic unsaturation (except, of course, where this is not possible as, for example, in the case of acetylenic unsaturation in the cyclopropyl system); halogen; nitro; hydroxy; thiol; cyano; carboxy; carboalkoxy; acyloxy; $C_1$–$C_{20}$ alkoxy; $C_1$–$C_{20}$ thioalkoxy; $C_6$–$C_{20}$ aryloxy; $C_6$–$C_{20}$ arylthio; $C_1$–$C_{20}$ alkyl sulfoxide; $C_1$–$C_{20}$ alkyl sulfone; $C_1$–$C_{10}$ alkyl amino; $C_2$–$C_{20}$ dialkylamino; amino; thiocyano; sulfonic acid, sulfonamide; etc.

In the second embodiment, Q, R, and R' can also be $C_6$–$C_{30}$ aryl; $C_6$–$C_{30}$ aryloxy, $C_6$–$C_{30}$ arylthio; $C_6$–$C_{30}$ arylamino; $C_{12}$–$C_{60}$ diarylamino; and substituted forms thereof including one or more of the following representative substituents, e.g., $C_1$ through $C_{15}$ alkyl; $C_3$ through $C_{30}$ cycloalkyl; halogen; nitro; thiocyano, hydroxy; thiol; amino; $C_1$ through $C_{10}$ alkylamino; $C_2$ through $C_{20}$ dialkylamino; haloalkyl (for example, trifluoromethyl); alkoxy; thioalkoxy; acyloxy; acyl; alkyl sulfoxide; alkyl sulfone; cyano; etc.

Additionally, moreover, R' can be hydrazino; $C_1$ through $C_{20}$ mono-, di-, and trialkyl hydrazino; R can be $C_1$ through $C_{20}$ acyl; $C_1$ through $C_{20}$ thioacyl; $C_2$ through $C_{20}$ dialkyl carbamoyl; $C_2$ through $C_{30}$ dialkyl carbamoyl; $C_1$ through $C_{20}$ alkylcarbamoyl; $C_1$ through $C_{20}$ alkylthiocarbamoyl; etc. Each of the foregoing groups can be substituted with the same type of substituents enumerated in the previous embodiments, e.g., olefinic or acetylenic unsaturation, (except, of course, where this is not possible as, for example, in the case of acetylenic unsaturation in the cyclopropyl system); halogen; nitro; hydroxy; thiol; cyano; carboxy; carbalkoxy; $C_1$ through $C_{20}$ alkoxy; $C_1$ through $C_{20}$ thioalkoxy; $C_6$–$C_{30}$ aryloxy; $C_6$–$C_{30}$ arylthiol; $C_1$ through $C_{20}$ alkyl sulfoxide; $C_1$ through $C_{20}$ alkyl sulfone; $C_1$ through $C_{10}$ alkyl amino; $C_2$ through $C_{20}$ dialkylamino; amino; thiocyano; etc.

The subscript $n$ in Formula A can be a positive integer of from 2 through 30; and the subscript $y$ can range from zero to complete substitution of the hydrogen atoms present in the cycloalkyl ring, preferably from 0 to 6, as when $n$ is 4.

In addition to its previous enumeration in the two embodiments above, Q can also be $C_1$ through $C_{20}$ acyloxy, heterocyclic (for example, furyl, pyridyl, etc.), wherein each of the foregoing groups can be substituted with such groups as $C_1$ through $C_{15}$ alkyl; halogen; nitro; thiocyano; hydroxy; thiol; amino; $C_1$ through $C_{10}$ alkylamino; $C_2$ through $C_{20}$ dialkylamino; haloalkyl (for example, trifluoromethyl); alkoxy; thioalkoxy; alkyl sulfoxide; alkyl sulfone; cyano; etc. Additionally, Q can be cyano; halogen; carboxy; carbalkoxy; perfluoroalkyl; thiocyano; alkyl sulfoxide; alkyl sulfone; nitro; hydroxy; thiol; sulfonic acid; sulfonamide; etc. Moreover, several different Q substituents can be present on the cycloalkyl ring simultaneously, as, for example, methyl groups and alkoxyl groups, etc.

With respect to Formula B; R, R', and Z are as previously defined for Formula A. X and Y can each be a $C_3$ through $C_{30}$ cycloalkyl group or, when one of these is such a group, the other may consist of a substituent such as halogen; nitro; thiocyano; hydrogen; or $C_1$ through $C_{15}$ alkyl, substituted by olefinic or acetylenic unsaturation (except where this is not possible as, for example, in the case of acetylenic unsaturation in the cyclopropyl system), halogen, nitro, hydroxy, thiol, cyano, carboxy, carbalkoxy, $C_1$ through $C_{20}$ alkoxy, $C_1$ through $C_{20}$ thioalkoxy, $C_6$–$C_{20}$ aryloxy, $C_6$–$C_{20}$ arylthio, $C_1$–$C_{20}$ alkyl sulfoxide, $C_1$ through $C_{20}$ alkyl sulfone, $C_1$ through $C_{10}$ alkylamino, $C_2$ through $C_{20}$ dialkylamino, amino, thiocyano, etc., as previously defined for the cyclic thiazole derivatives enumerated for Formula A above. In Formula C; Q, $y$, R, R', and Z can be identical with the embodiments of Formula A. In addition, $p$ and $q$ can be positive integers from 1–12 and W can be a hetero atom such as O, S(O)n where $n$ equals 0 to 2 or N-Q where Q is as previously defined.

In general the novel thiazole and oxazole derivatives of this invention are prepared from 2-amino thiazoles and oxazoles whose methods of preparation are well known in the art. For example, the 2-amino thiazoles can be prepared in accordance with the reactions proposed in Equation 1 below, shown by Charles D. Hurd and H. L. Wehrmeister in J. Am. Chem. Soc., Vol. 71, page 4007 (1949); and by Dodson and King in J. Amer. Chem. Soc., Vol. 67, page 2242 (1945) and Vol. 68 of the same Journal, page 871 (1946).

EQUATION (1)

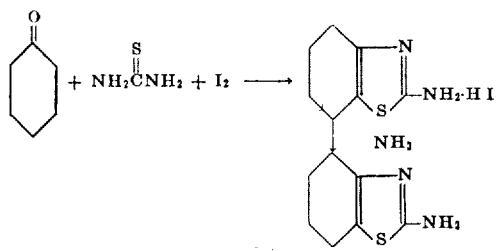

Alternatively, the 2-amino thiazoles can be prepared in accordance with Equation 2 shown below in accordance with the reactions carried out by Erlenmeyer and Schoenauer, Helvetica Chimica Acta, Vol. 24, page 172 (1941).

EQUATION (2)

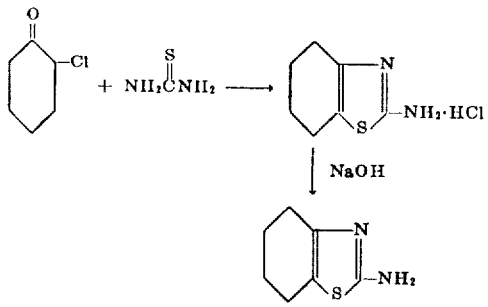

The third conventional method, disclosed by K. Gewald, H. Bottcher and R. Mayer in J. Prakt. Chemie, Vol. 23, page 298 (1964) proceeds in accordance with Equation 3 below.

EQUATION (3)

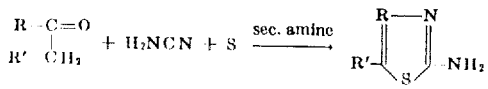

Those cyclic ketones containing a hetero atom in the ring can likewise be cyclized by the methods outlined in Equations (1), (2) and (3). The procedure outlined in Equation (3) has been most useful as for example:

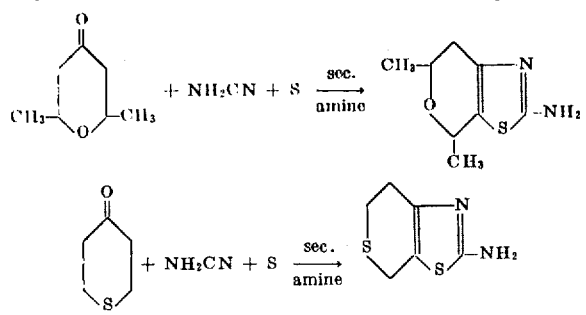

A fourth, somewhat specific method for preparing 2-aminothiazoles of this invention involves the reaction of an $\alpha\beta$-epoxyketone with thiourea. This method, using isophorone oxide as an example is illustrated in Equation 4.

EQUATION (4)

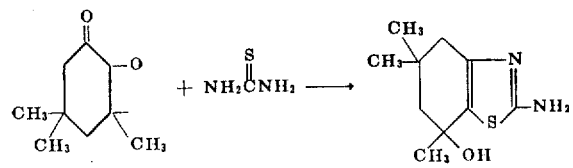

The isoxazole utilized in the present invention can be prepared by conventional methods similar to those outlined in the foregoing equations. The methods generally utilized are illustrated in the following equations:

Equation (5)

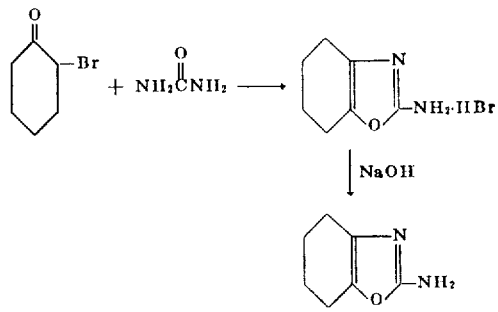

Equation (6)

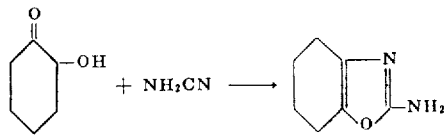

Equation (7)

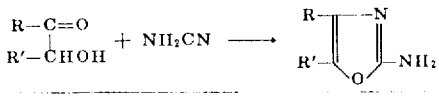

Starting with the 2-amino thiazoles or oxazoles, these can be converted to an amide by reaction with an acid anhydride or acyl chloride in benzene or pyridine solutions in accordance with the following equations shown in Method (1) below:

Method (1)

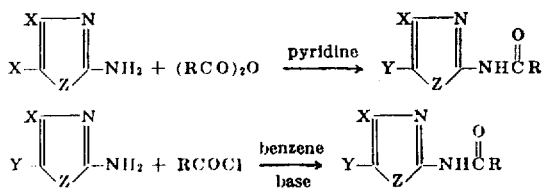

In each of the foregoing equations, removal of the solvent and recrystallization from an appropriate solvent such as ethanol or ligroin yields the desired amide.

Another method for preparing thiazole or oxazole compounds of this invention, denominated as Method (2), comprises reacting a 2-amino thiazole or oxazole with an isocyanate or isothiocyanate to yield an N-substituted urea or thiourea in accordance with the following equation:

Method (2)

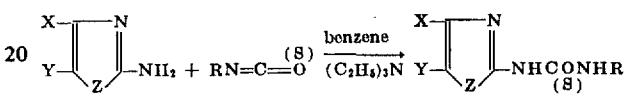

A third method for the preparation of the thiazole or oxazole compounds such as tri-substituted ureas and thioureas, of this invention, denominated as Method (3) is as follows:

Method (3)

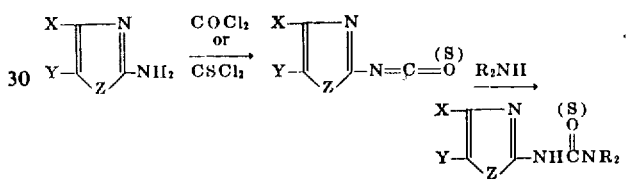

A fourth method for the preparation of the thiazoles or oxazoles of this invention, e.g., thiazole carbamates, oxazole carbamates, denominated as Method (4) is as follows:

Method (4)

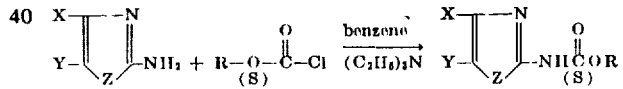

A fifth method, denominated as Method (5), for preparation of the thiazole or oxazole compounds of this invention comprises reaction of an appropriate 2-aminothiazole or oxazole with carbon disulfide in basic solution followed by treatment with an appropriate alkyl halide to yield a dithiocarbamate as shown below:

Method (5)

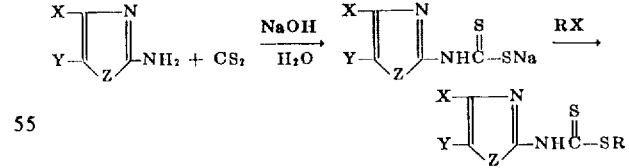

A sixth method denominated as Method (6), for preparing thiazole or oxazole imides illustrative of this invention comprises reaction of a thiazole or oxazole amide with additional acid anhydride as shown below:

Method (6)

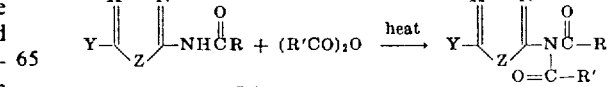

A seventh method denominated as method (7), for preparing thiazole or oxazole dithiobiuret derivatives comprises the reaction of a thiazole or oxazole isocyanate with thiuram disulfide.

Method (7)

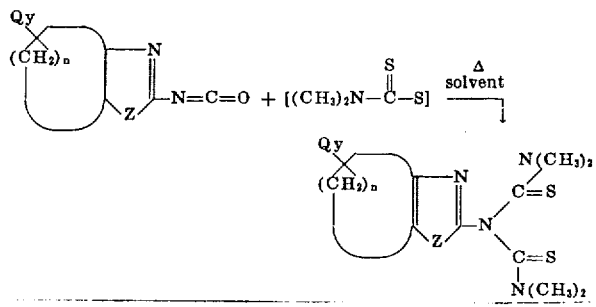

It should be understood that for Methods 1 to 7 above, the starting material may be a thiazole or oxazole without a ring system at the 4 and 5 positions, or a thiazole or oxazole with a carbocyclic ring at the 4,5-positions or a carbocyclic ring containing a hetero atom.

Typical illustrative reactants employed for Method (1) include, e.g., 4,5-dimethyl-2-aminothiazole; 4,5-dimethyl-2-amino-oxazole; 5,5,7-trimethyl-4,5,6,7-tetrahydro-2-aminobenzothiazole; 5,5,7-trimethyl-4,5,6,7-tetrahydro-2-aminobenzoxazole; 4-methyl-5-hexyl-2-aminothiazole; 4-methyl-5-hexyl-2-amino-oxazole; 4-chloro-4,5,6,7-tetrahydro-2-aminobenzothiazole; 4-chloro-4,5,6,7-tetra-hydro-2-aminobenzoxazole; 4-methoxy-6-methyl-4,5,6,7-tetrahydro-2-aminobenzothiazole; 4-methoxy-6-methyl-4,5,6,7-tetrahydro-2-aminobenzoxazole; 4,5-pentamethylene-2-aminothiazole; 4,5-pentamethylene-2-amino-oxazole; 4,5,6,7-tetrahydro-N-methyl-2-aminobenzothiazole, 4,5,6,7-tetrahydro-N-methyl-2-aminobenzoxazole, etc. with any of the following: acetyl chloride, formic acid, acetic anhydride, propionyl chloride, chloroacetyl chloride, cyclopropylcarbonyl chloride, trichloroacetic anhydride, dichloroacetylchloride, 2-methylvaleroyl chloride, bromoacetyl bromide, etc.

Typical illustrative reactants employed for Method (2) include any of the above illustrated 2-aminothiazoles and oxazoles with any of the following: methyl isocyanate, ethyl isocyanate, propyl isocyanate, isopropyl isocyanate, phenyl isocyanate, parachlorophenyl isocyanate, meta-trifluoromethylphenyl isocyanate, cyclohexylisothiocyanate, methylisothiocyanate, allyl isocyanate, etc. Typical reactants useful in Method (3) include amines such as 4,5-dimethyl-2-aminothiazole; 4,5-dimethyl-2-amino-oxazole; 5,5,7-trimethyl-4,5,6,7-tetrahydro-2-aminobenzothiazole; 5,5,7-trimethyl-4,5,6,7-tetrahydro-2-aminobenzoxazole; 4-methyl-5-hexyl-2-aminothiazole; 4-methyl-5-hexyl-2-amino-oxazole; 4-chloro-4,5,6,7-tetrahydro-2-aminobenzothiazole; 4-chloro-4,5,6,7-tetrahydro-2-aminobenzoxazole; 4-methoxy-6-methyl-4,5,6,7-tetrahydro-2-aminobenzothiazole; 4-methoxy-6-methyl-4,5,6,7-tetrahydro-2-aminobenzoxazole; 4,5-pentamethylene-2-aminothiazole; 4,5-pentamethylene-2-amino-oxazole; 4,5,6,7-tetrahydro-N-methyl-2-aminobenzothiazole; 4,5,6,7-tetrahydro-N-methyl-2-aminobenzoxazole, etc. which are reacted with phosgene or thiophosgene and then treated with dimethylamine, diethylamine, dipropylamine, aniline, 3,4-dichloroaniline, N-methoxy-N-methylamine, etc.

Typical illustrative reactants employed for Method (4) include any of the above-illustrated 2-aminothiazoles or oxazoles with any of the following: methyl chloroformate, ethyl thiochloroformate, isopropyl chloroformate, phenyl chloroformate, and parachlorophenyl chloroformate.

Typical illustrative reactants employed for Method (5) include any of the above-illustrated 2-aminothiazoles or oxazoles with carbon disulfide, and then with any of the following: methyl chloride, ethyl bromide, isopropyl iodide, n-butyl iodide, p-nitrochlorobenzene, etc.

Typical illustrative reactants employed for Method (6) include, e.g., 4,5-dimethyl-2-propionamidothiazole; 4,5-dimethyl-2-propionamido-oxazole; 5,5,7-trimethyl-4,5,6,7-tetrahydro-2-propionamido benzothiazole; 5,5,7-trimethyl-4,5,6,7-tetrahydro-2-propionamido benzoxazole; 4,5-tetramethylene-2-acetamidothiazole; 4,5-tetramethylene-2-acetamido-oxazole, and 4,5-dibutyl-2-propionamidothiazole and 4,5-dibutyl-2-propionamido-oxazole with any of the following: acetic anhydride, propionic anhydride, trifluoroacetic anhydride, chloroacetic anhydride, etc.

Exemplary reactants for Method (7) include, e.g., 5,5,7-trimethyl-4,5,6,7-tetrahydro-2-aminobenzothiazole and 5,5,7-trimethyl-4,5-6,7-tetrahydro-2-aminobenzoxazole, with e.g., thiuram disulfide.

The preferred thiazole and oxazole derivatives of this invention are characterized by the following formulas:

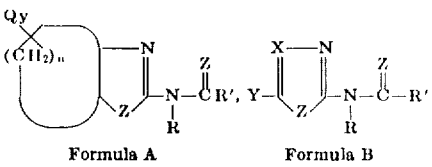

Formula A  Formula B and

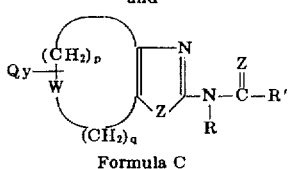

Formula C

For the cyclic structures of Formula A

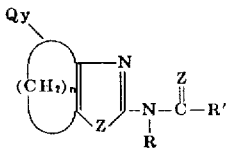

where $n$ is 2–30, inclusive, and $y$ is 0 to complete substitution of the hydrogens on the cycloalkyl ring, especially when $y$ is 0–8 for the 2-amino-4,5,6,7-tetrahydrobenzothiazole derivatives, the following substituents are exemplary:

Q is hydrogen, methyl, ethyl, isopropyl, n-propyl, isobutyl, sec-butyl, n-butyl, n-pentyl, n-hexyl, n-decyl, 2-methyloctyl, 2-methylpentyl, t-butyl, cyclopentyl, cyclohexyl, chlorine, bromine, fluorine, iodine, methoxyl, ethoxyl, methylthio, isopropylthio, phenyl, p-chlorophenyl, m-dimethylaminophenyl, nitro, thiocyanato, cyano, hydroxy, thiol, 2-chloroethyl, bromomethyl, 3-diethylaminopropyl, 2-cyanoethyl, amino, propylamino, dimethylamino, trifluoromethyl, trichloromethyl, furyl, vinyl, methyl, propenyl, 2- nitroethyl, 2-nitroethoxy, 3-carboethoxypropyl, 2-methylpyridyl, perfluoropropyl, methyl sulfinyl, butyl sulfonyl, p-chlorophenoxy, pentachlorophenylthio, and acetoxy, etc.

Z is oxygen or sulfur.

R is H, $C_1$ through $C_{15}$ alkyl; substituted alkyl; alkoxyl; acyl; aryl; thioacyl; e.g., R can be H, methyl, isopropyl, n-octyl, cyclohexyl, vinyl, methocyl, n-butoxy, cyclopentyloxy, acetyl, propionyl, phenyl, p-chlorophenyl, o-nitrophenyl, dimethylthiocarbamoyl, ethylthiocarbamoyl, diethylcarbamoyl, thioacetyl, amino, dimethylamino, 3-chloropropyl, 2-methoxyethyl, 2-chloroacetyl, 2-fluoroacetyl, anilino, and p-chlorophenoxy.

R' can be H, methyl, ethyl, 1-methyl-n-butyl, 1-propenyl, n-decyl, cyclopropyl, cyclohexyl, chloromethyl, dichloromethyl, trichloromethyl, fluoromethyl, bromomethyl, 2-chloroethyl, methoxymethyl, 2-diethylaminoethyl, methylmercapto methyl, methyl mercapto, ethyl mercapto, isopropyl mercapto, phenylthio, chlorophenylthio, p-nitrophenylthio, methoxyl, ethoxyl, isopropoxyl, 2-methoxyethoxy, n-butoxyl, phenoxyl, o-chlorophenoxy, p-chlorophenoxy, 2-chloroethoxy, and 3-chloropropoxy, amino, methylamino, dimethylamino, N-methoxy-N-methylamino, cyclohexylamino, etc.

For the non-cyclic or acylic structures of Formula B

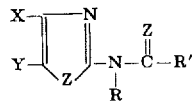

exemplary substituents representative of Z, R, and R' are the same as for Formula A above.

X and Y can be hydrogen and $C_1$ through $C_{10}$ unsubstituted or substituted alkyl, including $C_3$ through $C_{30}$ unsubstituted or substituted cycloalkyl. Exemplary of X and/or Y are: hydrogen methyl, ethyl, heptyl, chloromethyl, 2-methoxyethyl, cyclohexyl, cyclopentyl, 2-methylcyclohexyl, chlorine, bromine, fluorine, iodine, phenyl, p-chlorophenyl, m-nitrophenyl, thiocyano, nitro, 2-chlorocyclopentyl, 3-propenyl, 3-propynyl, 2-nitroethyl, 3,3,3-trifluoropropyl, 2-cyanoethyl, 3-methylsulfinylpropyl, 3-methyl-sulfonylpropyl, 3-dimethylaminopropyl, 2-thiocyanoethyl, etc.

For structures of Formula C, the exemplary substituents are as previously mentioned for Formula A.

It is to be understood that the above exemplary groups are applicable only within the framework of the prior art disclosures set forth previously in the Prior Art section of this description of the present invention.

Although the foregoing exemplary substituents are illustrative of both the cyclic and non-cyclic structures of this invention, as represented by Formula A, B, and C; those skilled in the art will of course recognize that a number of factors such as commercial unavailability of reactants, ease of reaction, etc., and other considerations will have considerable bearing on the nature of those 4,5-disubstituted 2-aminothiazole or oxazole derivatives of this invention which are deemed commercially attractive and the extent to which they can be made. For example, among these considerations is the fact that preparation of a thiazole or oxazole derivative when $n = 2$ is not a practical system to be obtained by conventional means since condensation of a cyclobutanone will not readily yield the desired thiazole or oxazole.

Another such consideration is the fact that preparation of thiazole or oxazole derivatives when $n$ is greater than 14 is somewhat impractical by virtue of the commercial unavailability of cyclic ketones with greater than 16 carbon atoms, despite the fact that such ketones are known in the literature and theoretically can be used in the synthetic sequences described herein.

Still another consideration is the fact that, since the cyclic ketones represent the general starting material for preparing the cyclic thiazole and oxazole derivatives of this invention, the only qualification that need be placed on such ketones to satisfy their utility in the practice of this invention is that they have a potential —$CH_2$— group adjacent to the carbonyl carbon since without this group ring closure to form the resultant thiazole or oxazole is impossible.

Accordingly, preferred ketones for purposes of this invention include, e.g.: (1) unsubstituted ketones such as cyclohexanone, cyclooctanone, cyclododecanone, etc.; (2) alkylated cyclohexanones such as 3-t-butyl cyclohexanone; 4-ethylcyclohexanone; 3-methylcyclopentanone; 3,3,5-trimethylcyclohexanone, etc; (3) cyclic ketones containing such groups as amino, alkylamino, dialkylamino, alkoxy, acyloxy, and hydroxy, etc., which can be prepared readily, e.g., by high pressure hydrogenation of aromatic compounds such as aminophenols, resorcinol monoethers or monoesters, dihydroxy benzenes, etc.

Other ketones useful in this invention include those, e.g, prepared by addition of various reagents to $\alpha,\beta$-unsaturated ketones such as 2-cyclohexene-1-one, e.g., to yield cyclic ketones having such substituents (Q) as halogen, cyano, thiol, thioalkoxy, etc. Oxidation of those cyclic ketones in which Q is thioalkoxy can then readily yield the corresponding alkylsulfoxides or alkylsulfones.

Still other useful ketones can be prepared by typical reactions such as the Michael addition reaction wherein active methylene compounds are added on to $\alpha,\beta$-unsaturated carbonyl compounds to yield cyclic ketones in which Q can be a wide array of substituted alkyl groups.

Cyclic ketones containing a hetero atom are also useful in this invention as for example 2,2,6,6-tetramethyl-$\gamma$-piperidone, 2,6-dimethyl-tetrahydro-$\gamma$-pyrone, 4-thiacyclohexanone, etc.

In addition to the preparation of the thiazoles and oxazoles of this invention from substituted cyclic ketones, it may occasionally be preferred that such thiazole or oxazole products be formed by substitution reactions directly on the cycloaliphatic ring. For example, it is possible to halogenate a 2-amino-4,5-polymethylenethiazole or oxazole with such reagents as N-chlorosuccinimide, elemental chlorine or bromine as well as other conventional halogenating agents. The halogen group(s) then present on the cycloaliphatic ring can subsequently be displaced by such substituents as alkoxy, thioalkoxy, nitro, thiocyano, etc. This second method of preparing thiazole and oxazole is of somewhat less usefulness generally than is the case when one starts with substituted cyclic ketones.

A further consideration is the fact that the value of $y$ can vary substantially in the lower members of the series when $n$ is 3 to 6 since synthesis methods are available for systems of this type. However, when one uses the higher cyclic ketones, e.g., when $n$ is 8 to 30, it is considerably more difficult to prepare substituted compounds in which $y$ is a large number. The practical limitations of synthesizing compound having poly-substitution of Q are reached when $n$ is a value of 6.

In view of the foregoing considerations, among other things, the most preferred thiazole and oxazole compounds of this invention are those where $n$ is from 3 to 6 since these compounds can be most readily prepared from the corresponding ketones. In particular, thiazole and oxazole compounds where $n = 4$ can be most readily prepared from substituted cyclohexanones. However, this does not necessarily mean that maximum biological activity of the resultant thiazole or oxazole is present when $n$ is 4, since it has been found herein that compounds whose $n$ value is other than 4 have significant biological activity.

Non-limiting, typical preferred thiazole derivatives of this invention, exemplary of compounds embraced by the previous general formula (i.e., Formulas A, B and C) include, but by no means exhaustively: 5 5 7-trimethyl-4,5,6,7-tetrahydro-2-propionamidobenzothiazole, 5,5,7-trimethyl-4,5,6,7-tetrahydro-2-propionamidobenzoxazole, 5,5,7-trimethyl-4,5,6,7-tetrahydro-2-acetamidobenzothiazole, 5,5,7-trimethyl-4,5,6,7-tetrahydro-2-acetamidobenzoxazole, 4,5-tetramethylene-2-[alpha, alpha, alphatrichloracetamido]-thiazole, 4,5-tetramethylene-2-[alpha, alpha, alphatri-chloracetamido]-oxazole, N-[4,5-tetramethylene-2-thiazolyl]-N'-methylurea, N-[4,5-tetramethylene-2-oxazolyl]-N'-methylurea, 4-methyl-5-pentyl-2-thiazolyl-O -methyl-carbamate, 4-methyl-5-pentyl-2-oxazolyl-0-methyl-carbamate, 5,5,7-trimethyl-4,5,6,7-tetrahydro-2-benzothiazolyl-0-isopropyl carbamate, 5,5,7-trimethyl-4,5,6,7-tetrahydro-2-benzoxazolyl-0-isopropyl carbamate, 3-[4,5, tetramethylene-2-thiazolyl]-1,1,5,5-tetramethyl dithiobiuret, 3-[4,5, tetramethylene-2-oxaolyl]-1,1,5,5-tetramethyl dithiobiuret, 3-[5,7-dimethyl-4,5,6,7-tetrahydro-2-benzothiazolyl]-1,1,5,5-tetramethyldithiobiuret, 3-[5,7-dimethyl-4,5,6,7-tetrahydro-2-benzoxazolyl]-1,1,5,5-tetramethyl-dithiobiuret, 3-[4,5-tetramethylene-2-thiazolyl]-1,1,5,5-tetramethylbiuret, 3-[4,5-tetramethylene- 2-oxazolyl]1,1,5,5tetramethylbiuret, 2-propionamido-5,5,7-trimethyl-7-cyano-4,5,6,7-tetrahydrobenzothiazole, 2-propionamido-5,5,7-trimethyl-7-cyano-4,5,6,7-tetrahydrobenzoxazole, 2-propionamido-5,7-dimethyl-5-cyano-4,5,6,7-tetrahydrobenzothiazole, 2-propionamido-5,7-dimethyl-5-cyano-4,5,6,7-tetrahydrobenzoxazole, N,N-dimethyl-N'-[5,5,7-trimethyl- 4,5,6,7-terahydrobenzothiazol-2-yl] urea, N,N-dimethyl-N'-[5,5,7-trimethyl-4,5,6,7-tetrahydrobenzoxazol-2-yl] urea, N,N-dimethyl-N'-[5,5,7-trimethyl-7-cyano-4,5,6,7-tetrahydrobenzothiazol-2-yl] urea, N,N-dimethyl-N'-[5,5,7-trimethyl-7-cyano-4,5,6,7-tetrahydrobenzocazol-2-yl] urea, N,N-dimethyl-N'-[5,5,7,7-tetramethyl-4,5,6,7-tetrahydrobenzothiazol-2-yl] urea, N,N-dimethyl-N'-[5,7,7-tetramethyl- 4,5,6,7-tetrahydrobenzoxazol-2-yl] urea, N,N-dimethyl-N'-[5,7-dimethyl-6-oxa-4,5,6,7-tetrahydrobenzothiazol-2-yl] urea, N,N-dimethyl-N'-[5,7-dimethyl-6-oxa-4, 5,6,7-tetrahydrobenzoxazol-2-yl] urea, etc.

Many of the thiazole derivatives of this invention exist as mixtures of stereoisomeric forms such as cis- and trans-isomers; therefore, the present invention, it is to be understood, relates to any and/or all of these forms and/or mixtures thereof.

The most preferred compounds of this invention include: 5,5,7-trimethyl-4,5,6,7-tetrahydro-2-propionamido benzothiazole, 5,5,7-trimethyl-4,5,6,7-tetrahydro-2-propionamido benzoxazole, 5,5,7,7-tetramethyl-4,5,6,7-tetrahydro-2-propionamido benzothiazole, 5,5,7,7-tetramethyl-4,5,6,7-tetrahydro-2-propionamido benzoxazole, 5,5,7-trimethyl-4,5,6,7-tetrahydro-2-acetamido benzothiazole, 5,5,7-trimethyl-4,5,6,7-tetrahydro-2-acetamido benzoxazole, and 5,5,7-trimethyl-4,5,6,7-tetrahydro-2-cyclopropylcarboxamido benzothiazole, 5,5,7-trimethyl-4,5,6,7-tetrahydro-2-cyclo-propylcarboxamido benzoxazole, 2-propionamido-5,5,7-trimethyl-7-cyano-4,5,6,7-tetrahydrobenzothiazole, 2-propionamido-5,5,7-trimethyl-7-cyano-4,5,6,7-tetrahydrobenzoxazole, 2-propionamido-5,7-dimethyl-5-cyano-4,5,6,7-tetrahydrobenzothiazole, 2-propionamido-5,7-dimethyl-5-cyano-4,5,6,7-tetrahydrobenzoxazole, N,N-dimethyl-N'-[5,5,7-trimethyl-4,5,6,7-tetrahydrobenzothiazol-2-yl] urea, N,N-dimethyl-N'-[5,5,7-trimethyl-4,5,6,7-tetrahydrobenzoxazol-2-yl] urea, N,N-dimethyl-N'-[5,5,7-trimethyl-7-cyano4,5,6,7-tetrahydrobenzothiazol-2-yl] urea, N,N-dimethyl-N'-[5,5,7-trimethyl-7-cyano-4,5,6,7-tetrahydrobenzoxazol-2-yl] urea, N,N-dimethyl-N'-[5,5,7,7-tetramethyl-4,5,6,7-tetrahydrobenzo-thiazol-2-yl] urea, N,N-dimethyl-N'-[5,5,7,7-tetramethyl-4,5,6,7-tetrahydrobenzoxazol-2-yl] urea, N,N-dimethyl-N'-[5,7-dimethyl-6-oxa-4,5,6,7-tetrahydrobenzoxazol-2-yl] urea, N,N-dimethyl-N'-[5,7-dimethyl-6-oxa-4,5,6,7-tetrahydrobenzothiazol-2-yl] urea.

For use as herbicides, a number of the previously described non-cyclic 2-aminothiazoles and oxazoles are believed novel and include compounds of the same general formula as before:

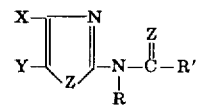

where, in this instance, Z is O or S and X or Y or both can be $C_1$ through $C_{15}$ alkyl; $C_3$ through $C_{30}$ cyclo alkyl substituted by olefinic or acetylenic unsaturation (except where this is not possible as e.g. acetylenic unsaturation in the cyclopropyl system), halogen, nitro, hydroxy, thiol, cyano, carboxy, carbalkoxy, $C_1$ through $C_{20}$ alkoxy, $C_1$ through $C_{20}$ thioalkoxy, aryloxy, arylthio, $C_1$ through $C_{20}$ alkyl sulfoxide, $C_1$ through $C_{20}$ alkyl sulfone, $C_1$ through $C_{10}$ alkylamino, $C_2$ through $C_{20}$ dialkylamino, amino, thiocyano, etc. Alternatively, X OR Y or both can be aryl substituted by $C_1$ through $C_{15}$ alkyl, halogen, nitro, thiocyano, hydroxy, thiol, amino, $C_1$ through $C_{10}$ alkylamino, $C_2$ through $C_{20}$ dialkylamino, haloalkyl (e.g., trifluoromethyl), alkoxy, thioalkoxy, alkylsulfoxide, alkylsulfone, cyano, etc.

For the above-mentioned herbicidal non-cyclic 2-aminothiazoles and oxazoles R' can be hydrogen; $C_1$ through $C_{15}$ alkyl; $C_3$ through $C_{30}$ cycloalkyl; $C_1$ through $C_{20}$ alkoxy; $C_3$ through $C_{30}$ cycloalkoxy; $C_1$ through $C_{20}$ thioalkoxy; each of the above alkyl or cycloalkyl groups can be substituted with olefinic or acetylenic unsaturation (except where this is not possible as for example acetylenic unsaturation in the cyclopropyl system); halogen, nitro; hydroxy; thiol; cyano; carboxy; carbalkoxy; acyloxy; $C_1$ through $C_{20}$ thioalkoxy; aryloxy; arylthio; $C_1$ through $C_{20}$ alkyl sulfoxide, $C_1$ through $C_{20}$ alkyl sulfone; $C_1$ through $C_{10}$ alkylamino; $C_2$ through $C_{20}$ dialkylamino; amino, thiocyano, sulfonic acid, sulfonamide, $C_1$ through $C_{20}$ alkoxy; etc.

R' can also be aryl; aryloxy; arylthio; where each of these types can be substituted with $C_1$ through $C_{15}$ alkyl, $C_3$ through $C_{30}$ cycoalkyl, halogen, nitro, thiocyano, hydroxy, thiol, amino, $C_1$ through $C_{10}$ alkyl amino, $C_2$ through $C_{20}$ dialkylamino, haloalkyl (for example trifluoromethyl) alkoxy, thioalkoxy, acyoxy, acyl, alkyl sulfoxide, alkyl sulfone, cyano, etc. R' can also be hydrazino; $C_1$ through $C_{20}$ mono-, di, or trialkyl hydrazino.

R can be hydrogen; $C_1$ through $C_{15}$ alkyl; $C_3$ through $C_{30}$ cycloalkyl; $C_1$ through $C_{20}$ alkoxy; $C_3$ through $C_{30}$ cycloalkoxy; $C_1$ through $C_{20}$ thioalkoxy; amino, $C_3$ through $C_{20}$ cycloalkyl amino; $C_3$ through $C_{20}$ polymethylene amine; $C_1$ through $C_{10}$ alkylamino; $C_2$ through $C_{20}$ dialkylamino; $C_6$ through $C_{30}$ dicycloalkylamino; etc. R may also be aryl, aryloxy, arylthio, arylamino, diarylamino, $C_1$ through $C_{20}$ acyl, $C_1$ through $C_{20}$ thiolacyl; $C_2$ through $C_{20}$ dialkyl carbamoyl, $C_2$ through $C_{30}$ dialkyl thiocarbamoyl; $C_1$ through $C_{20}$ alkyl carbamoyl, $C_1$ through $C_{20}$ alkyl thiocarbamoyl.

Each of the preceding R moieties can be substituted with those groups as described previously for R'.

As previously noted, the thiazole and oxazole derivatives of this invention are useful as pesticides, particularly as herbicides. When used as herbicides the biologically active ingredients of this invention are preferably formulated with a suitable carrier or diluent or combinations thereof.

The term "carrier" or "diluent" as used herein means a material, which can be inorganic or organic and synthetic or of natural origin, with which the active thiazole or oxazole is mixed or formulated to facilitate its storage, transport, and handling and application to the plants, e.g., weeds, to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferably solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the thiazole employed.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575°F., or boiling in the range of about 575° to about 1,000°F., and having an unsulfonatable residue of at least about 75 percent and preferably of at least about 90 percent, or mixtures of these two types of oil, are particularly suitable liquid carriers.

For application as a soil-applied herbicide, the preferable carrier should be a granular inert carrier, e.g., 25/50 mesh (U.S. sieve size) or can also be a simple or compound fertilizer which can be a solid, preferably granular or pelleted, or a liquid, as for example an aqueous solution in which the toxicant is suspended or emulsified.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active thiazole ingredient, preferably from about 20 to about 80 weight percent. These concentrates can be diluted with the same or different carrier to a concentration suitable for application. The compositions of this invention may also be dilute compositions suitable for application. In general, concentrations of about 0.1 to about 10 percent, by weight, of active material based on the total weight of the composition are satisfactory, although lower and higher concentrations can be applied if necessary.

The compositions of the invention can be formulated as wettable powders comprising a major proportion of the active thiazole mixed with a dispersing, i.e., deflocculating or suspending agent, and, if desired, a finely divided solid carrier and/or a wetting agent. The thiazole or oxazole can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about six to 15 ethylene oxide units in the molecule. Other non-ionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Aerosol," sodium salts of sulfonated castor oil, sodium dodecyl benzene sulfonate, etc. The resulting wettable powder should preferably be ground to an average particle size of about 2–20 microns.

Granulated or pelleted compositions comprising a suitable carrier having the active thiazole or oxazole ingredient incorporated therein are also included in this invention. These can be prepared by impregnating a granular carrier with a solution of the thiazole or by granulating a mixture of a finely divided solid carrier and the active thiazole. The carrier used can consist of or contain a fertilizer or fertilizer mixture, as for example a superphosphate.

The compositions of this invention can also be formulated as solutions of the active thiazole or oxazole ingredient in an organic solvent or mixture of solvents, such as for example alcohols; ketones, especially acetone; etc.

Compositions of the present invention can also be formulated as emulsifiable concentrates which are concentrated solutions or dispersions of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a non-aqueous phase.

The present invention is further illustrated in greater detail by the following examples, but it is to be understood that the present invention in its broadest aspects, is not necessarily limited in terms of the reactants or specific temperatures, residence times, separation techniques, and other process conditions, or dosage levels, exposure times, test plants used, etc., by which the compounds and/or compositions or formulations described and claimed are prepared and/or used.

EXAMPLE 1

Preparation of 2-amino-5,5,7-trimethyl-4,5,6,7-tetrahydrobenzothiazole

To a mixture of 90 g. dihydroisophorone, 21 g. of cyanamid, 16 g. of sulfur and 80 ml. ethanol was added dropwise 50 ml. diethylamine over a 1 hr. period. The reaction mixture was contained in a 500 ml. round-bottom flask fitted with a thermometer and a condenser with a drying tube and the mixture was stirred by means of a magnetic stirrer. The exothermic reaction was held below 45°C. by external cooling and the mixture was stirred for 2 hours at 40°–45°C. At this point the sulfur was completely consumed and the reaction mixture was poured into 500 ml. $H_2O$ and acidified to a pH of 4 with concentrated hydrochloric acid. The unreacted ketone was extracted with six 200 ml. portions of ether and the aqueous portion was then treated with 50 percent sodium hydroxide solution until a pH of 9 was attained. The 2-amino-thiazole compound was then extracted with ether, the ether extracts dried over sodium sulfate, and filtered; and the ether was removed on a rotary concentrator. Distillation of the crude product at 132°–133°C. at 0.3 mm gave the desired amine in 75–85 percent yield.

Elemental Analysis

Calculated for $C_{10}H_{16}N_2S$: C, 61.2; H, 8.15; N, 14.3
Found: C, 61.08; H, 8.40; N, 14.5

The structure of this compound was confirmed by N.M.R. spectro-scopy.

EXAMPLE 2

Preparation of 2-Propionamido-5,5,7-trimethyl-4,5,6,7-tetrahydrobenzothiazole

To a solution of 100 g. 2-amino-5,5,7-trimethyl-4,5,6,7-tetrahydrobenzothiazole in 400 ml. dry pyridine was added drop-wise 93.6 g. propionic anhydride over a 1 hour period. The temperature rose from 26°C. to 37°C. during this time. The reaction mixture was then stirred at room temperature for 2 hours and for an additional hour at 50°C. The solution was then cooled to room temperature and added slowly to 1500 ml. $H_2O$ with stirring. The tan solids which formed were then filtered and air dried and finally dried overnight in a vacuum oven at 80°C.

Yield 119 g. (93 percent) m.p. 127°–135°C. Recrystallization from ethanol yielded the pure product having a m.p. 145°–147°C.

Elemental Analysis

Calculated for $C_{13}H_{20}N_2OS$: C, 61.9; H, 7.94; N, 11.1

Found: C, 63.0; H, 8.36; N, 11.4

The structure of this compound was confirmed by N.M.R. spectro-scopy.

The oxygen analog of the above compound, i.e., 2-propionamido-5,5,7-trimethyl-4,5,6,7-tetrahydrobenzoxazole is prepared in the same manner utilizing 2-amino-5,5,7-trimethyl-4,5,6,7-tetrahydrobenzoxazole as the starting material. The structure of the product is determined by N.M.R. spectroscopy.

EXAMPLE 3

Preparation of 5,7-Dimethyl-2-cyclopropylcarboxamido-4,5,6,7-tetrahydrobenzothiazole To a solution of 5.46 g. (0.03 mole) 2-amino-5,7-dimethyl-4,5,6,7-tetrahydrobenzothiazole, 60 ml. benzene and 4.85 g. triethylamine was added dropwise 3.45 g. (0.033 mole) cyclopropane-carboxylic acid chloride over a 1 hour period. The reaction mixture was stirred during this addition and the temperature gradually rose from 25°C. to 40°C. A precipitate of triethylamine hydrochloride began to form immediately and the reaction mixture was then stirred at room temperature for 2 hours and then at 55°–60°C. for an additional hour. After cooling, the hydrochloride salt was filtered and the solvent removed on a rotary concentrator. The crude product was dissolved in 5 percent ethanolic-aqueous sodium hydroxide and stirred for 1 hour at room temperature. Removal of the ethanol on a rotary concentrator and filtration of the solid product yielded 7.3 g. of the desired product, m.p. 179°–181°C.

Elemental Analysis

Calculated for $C_{13}H_{18}N_2OS$: C, 62.3; H, 7.2; N, 11.2

Found: C, 62.15; H, 7.7; N, 11.8

The structure of this compound was confirmed by N.M.R. spectroscopy.

The oxygen analog of the above compound, i.e., 5,7-dimethyl-2-cyclopropylcarboxamido-4,5,6,7-tetrahydrobenzoxazole is prepared in the same manner utilizing 2-amino-5,7-dimethyl-4,5,6,7-tetrahydrobenzoxazole as the starting material. The structure of the product is determined by N.M.R. spectroscopy.

EXAMPLE 4

Preparation of N-[5,5,7-trimethyl-4,5,6,7-tetrahydrobenzothiazolyl]-N'-methylurea To a solution of 4.4 g. (0.0224 mole) of 2-amino-5,5,7-trimethyl-4,5,6,7-tetrahydrobenzothiazole, 40 ml. dry benzene and 0.5 ml. triethylamine was added 2.8 g. (0.05 mole) of methyl isocyanate. The mixture was stirred overnight and filtered to yield 2.4 g. of desired product, m.p. 194°–196°C. Treatment of the mother liquors with a small amount of ligroin precipitated an additional 1.2 g. product m.p. 191°–195°C.

Elemental Analysis

Calculated for $C_{12}H_{19}N_3OS$: N, 16.6

Found: N, 16.98

The structure of this compound was confirmed by N.M.R. spectro-scopy.

The oxygen analog of the above compound, i.e. N-[5,5,7-trimethyl-4,5,6,7-tetrahydrobenzoxazolyl]-N'-methylurea is prepared in the same manner utilizing 2-amino-5,5,7-trimethyl-4,5,6,7-tetrahydrobenzoxazole as the starting material. The structure is determined by N.M.R. spectroscopy.

EXAMPLE 5

Preparation of N-[5,5,7-trimethyl-4,5,6,7-tetrahydrobenzothiazole]-N'-methylthiourea A solution of 10.8 g. (0.05 mole) of the amine recited in Example 4, 6.1 g. (0.084 mole) methyl isothiocyanate, 100 ml. absolute ethanol and 0.5 ml. triethylamine was refluxed for 24 hours in a 250 ml. round-bottom flask fitted with a water condenser and drying tube. Upon cooling the ethanol solution, 5.4 g. of desired thiourea precipitated and was isolated by filtration, m.p. 225°–229°C.

Elemental Analysis

Calculated for $C_{12}N_3S_2H_{19}$: C, 53.5; H, 7.07; N, 15.6

Found: C, 53.5; H, 7.57; N, 15.6

The structure of this compound was confirmed by N.M.R. spectroscopy.

The oxygen analog of the above compound, i.e. N-[5,5,7-trimethyl-4,5,6,7-tetrahydrobenzoxazolyl]-N'-methylthiourea, is prepared in the same manner utilizing 2-amino-5,5,7-trimethyl-4,5,6,7-tetrahydrobenzoxazole as the starting material. The structure is determined by N.M.R. spectroscopy.

EXAMPLE 6

Preparation of 5,5,7-trimethyl-4,5,6,7-tetrahydro-2-benzothiazolyl-0-methylcarbamate To a solution of 9.8 g. (0.05 mole) of the amine recited in Example 4 and 50 ml. dry benzene were added 4.8 g. (0.05 mole) of methyl chloroformate, 10 ml. triethylamine, and 50 ml. dry benzene. The temperature rose from 20°C. to 30°C. during the addition process. The mixture was stirred overnight at room temperature, filtered, and the benzene filtrate evaporated on a rotary concentrator. The residue was recrystallized from ethanol-benzene to yield 0.6 gm. bisurea, m.p. 293°–299°C. which was discarded. The mother liquors were evaporated and the residue was recrystallized from methanol to yield 5.0 g. of desired carbamate, m.p. 126°–127°C. The structure of the carbamate recovered, i.e., 5,5,7-trimethyl-4,5,6,7-tetrahydro-2-benzothia-zolyl-0-methylcarbamate, was confirmed by N.M.R. spectroscopy.

The oxygen analog of the above compound, i.e., 5,5,7-trimethyl-4,5,6,7-tetrahydro-2-benzoxazolyl-0-methyl carbamate is prepared in the same manner utilizing 5,5,7-trimethyl-4,5,6,7-tetrahydro-2-benzoxazole as the starting material. The structure of the product is determined by N.M.R. spectroscopy.

EXAMPLE 7

Preparation of 4-n-butyl-5-n-propyl-2-aminothiazole

To a mixture of 42.6 g. (0.3 mole) 5-nonanone, 13.9 g. (0.33 mole) cyanamid, 9.6 g. sulfur and 50 ml. absolute ethanol were added dropwise 30 ml. diethylamine. The reaction mixture warmed from 20°C. to 36°C. over a 30-minute period and the mixture was then slowly heated to 73°C. during which time the sulfur was consumed. After heating at 73°C. for 30 minutes, the reaction mixture was cooled and poured into 400 ml. of water and acidified to a pH of 2 with concentrated hydrochloric acid. The aqueous solution was filtered and extracted with 2–200 ml. portions of ether. The aqueous layer was then treated with 50 percent sodium hydroxide solution to a pH of 9. The 2-aminothiazole was then extracted with four 200 ml. portions of ether, the ether extracts dried over sodium sulfate, filtered, and the ether removed on a rotary concentrator. The crude product was then distilled through a short path to yield 14.7 g. pure product, b.p. 131°–137°C. at 0.4 mm.
Elemental Analysis
Calculated for $C_{10}H_{18}N_2S$: C, 60.5; H, 9.1; N, 14.15
Found: C, 59.9; H, 9.07; N, 14.30
The structure of this compound was confirmed by N.M.R. spectro-scopy.

EXAMPLE 8

Preparation of 2-Propionamido-4-n-butyl-5-n-propylthiazole

To a solution of 5.0 g. (0.025 mole) of the amine recited in Example 7, and 20 ml. pyridine were added dropwise 3.6 g. (0.028 mole) of propionic anhydride. The temperature rose from 25°C. to 33°C., after which the solution was stirred for 1 hour at room temperature and 2 hours at 50°C. The solution was then poured into 100 ml. of water. Filtration and vacuum drying of the solid product gave 6.8 g. of crude amide. Recrystallization from ligroin yielded 4.5 g. of fluffy tan plates, m.p. 88°–90C. A second crop of 0.3 g. was obtained from the mother liquors, m.p. 88°–90.5°C.
Elemental Analysis
Calculated for $C_{13}H_{22}N_2SO$: C, 61.4; H, 8.65; N, 11.0
Found: C, 61.32; H, 8.35; N, 11.12
The structure of this compound was confirmed by N.M.R. spectro-scopy.

The oxygen analog of the above compound, i.e., 2-propionamido-4-n-butyl-5-n-propyl-oxazole is prepared in the same manner utilizing 4-n-butyl-5-n-propyl-2-amino-oxazole as the starting material.

EXAMPLE 9

Preparation of 2-amino-4,5-hexamethylenethiazole

To a mixture of 25.2 g. (0.2 mole) of cyclooctanone, 6.4 g. (0.2 mole) of sulfur, 8.4 g. (0.2 mole) of cyanamid and 20 ml. of ethanol were added 20 ml. diethylamine dropwise over a 15-minute period. When the exothermic reaction had ended, the mixture was heated at 45°C. for 1 hour. The reaction mixture was then poured into water, acidified with concentrated hydrochloric acid and extracted with three 50 ml. portions of ether. The aqueous solution was then neutralized with 10 percent sodium hydroxide, and the product was extracted with four 100 ml. portions of ether. The ether extracts were dried over sodium sulfate, filtered, and the ether evaporated on a rotary concentrator. Short path distillation of the crude product yielded 7.6 g. of the desired 2-amino-4,5-hexamethylenethiazole, m.p. 56°–58°C.
Elemental Analysis:
Calculated for $C_9H_{14}N_2S$: C, 59.5; H, 7.7
Found: C, 60.34; H, 8.24
The structure of this compound was confirmed by N.M.R. spectroscopy.

EXAMPLE 10

Preparation of 2-Propionamido-4,5-hexamethylenethiazole

To a solution of 4.5 g. of 2-amino-4,5-hexamethylenethiazole and 2.5 ml. of pyridine were added dropwise 6 g. propionic anhydride. The reaction mixture was stirred at room temperature for 2 hours and at 50°C. for an additional 0.5 hour. The solution was then poured into water with stirring, and the solid amide was then filtered and dried in vacuo. The crude product was recrystallized from ethanol to yield 7.1 g. of the desired amide, m.p. 154°–157°C.
Elemental Analysis
Calculated for $C_{12}H_{18}N_2OS$: N, 12.4
Found: N, 11.85
The structure of this compound was confirmed by N.M.R. spectroscopy.

The oxygen analog of the above compound, i.e., 2-propionamido-4,5-hexamethylene-oxazole is is prepared in the same manner utilizing 2-amino-4,5-hexamethylene-oxazole as the starting material. The structure of the product is determined by N.M.R. spectroscopy.

EXAMPLE 11

Preparation of 2-Propionamido-4-methyl-5-cyclohexylthiazole

To a solution of 3.5 g. of 2-amino-4-methyl-5-cyclohexylthiazole and 20 ml. of pyridine, were added 2.8 g. of propionic anhydride dropwise. By the procedure described in Example 10, a total of 4.0 g. of product was obtained, m.p. 128°–143°C. The presence of a small amount of tarry material prevented further purification by recrystallization. The structure of this product was verified by N.M.R. spectroscopy.

The oxygen analog of the above compound, i.e., 2-propionamido-4-methyl-5-cyclohexyl-oxazole is prepared in the same manner utilizing 2-amino-4- methyl-5-cyclohexyl-oxazole as the starting material. The structure of the product is determined by N.M.R. spectroscopy.

EXAMPLE 12
Preparation of 2-amino-5,7-Dimethyl-6-Oxa-4,5,6,7-tetrahydrobenzothiazole To a mixture of 14.9 g. 2,6-dimethyltetrahydro-4-pyranone, 4.2 g. cyanamide 3.2 g. sulfur and 20 ml. ethanol was added dropwise 10 ml. diethylamine. After initial exotherm had ended, the solution was heated at 50° for 1 hour until all sulfur was consumed. The dark brown solution was cooled and poured into 150 ml. of water. The aqueous suspension was acidified with concentrated hydrochloric acid extracted with 3 × 50 ml. ether and the aqueous solution was neutralized with 50 percent sodium hydroxide solution. Extraction of the dark oily product with 3 × 100 ml. ether followed by drying of the ether extracts over sodium sulfate and removal of the ether on a rotary concentrator yielded 16.9 g. of a brown semi-solid product. This crude material was slurried in 50 ml. benzene and filtered to yield the product, a light tan solid, m.p. 148°–151°C.
Elemental Analysis Calculated for $C_8H_{12}N_2OS$: C, 52.2; H, 6.53; N, 15.22

Found: C, 52.5; H, 7.7; N, 15.43

EXAMPLE 13
Preparation of 2-Propionamido-5,7-dimethyl-6-Oxa-4,5,6,7-tetrahydrobenzothiazole To a solution of 5.5 g. of the amino compound of Example 12 in 20 ml. pyridine was added 4.3 g. propionic anhydride. The reaction was carried out in the manner described in Example 2 to yield 4.5 g. of the desired product, m.p. 169°–170.5°C.
Elemental Analysis Calculated for $C_{11}H_{16}N_2O_2S$: C, 55.0; H, 6.67; N, 11.65

Found: C, 53.6; H, 7.0; N, 11.64

The oxygen analog of the above compound, i.e. 2-propionamido-5,7-dimethyl-6-oxa-4,5,6,7-tetrahydrobenzoxazole is prepared in the same manner utilizing 2-amino-5,7-dimethyl-6-oxa-4,5,6,7-tetrahydrobenzoxazole as the starting material. The structure of the product is determined by N.M.R. spectroscopy.

EXAMPLE 14
Preparation of N,N-Dimethyl-N'-(5,5,7,7-tetramethyl-4,5,6,7-tetrahydrobenzothiazol-2-yl)urea To a solution of 6.5 g. dimethylcarbamoyl chloride in 20 ml. pyridine, cooled to 5°–10°C., was added dropwise 10.5 g. of 2-amino-5,5,7,7-tetramethyl-4,5,6,7-tetrahydrobenzothiazole dissolved in 30 ml. pyridine. The solution was kept below 15° during the addition period and then allowed to warm to room temperature. The solution was then heated to 60°C. for 15 minutes, cooled and poured into 150 ml. of water. The tan solids which formed were filtered and dried in vacuo. Yield 16.2 g. m.p. 134°–136°C. Recrystallization from ethanol-water yielded light tan flakes m.p. 138°–140°C.
Elemental Analysis Calculated for $C_{14}H_{23}N_3OS$: C, 59.9; H, 8.2; N, 14.9

Found: C, 60.41; H, 8.69; N, 14.42

The oxygen analog of the above compound, i.e., N,N-dimethyl-N'-(5,5,7,7-tetramethyl-4,5,6,7-tetrahydrobenzoxazol-2-yl) urea is prepared in the same manner utilizing 2-amino-5,5,7,7-tetramethyl-4,5,6,7-tetrahydrobenzoxazole as the starting material. The structure of the product is determined by N.M.R. spectroscopy.

EXAMPLE 15
Preparation of 2-Propionamido-4,5,6,7-tetrahydrobenzoxazole

To a 100 ml. round bottomed flask fitted with a stirrer, a water condenser, a thermometer, and a dropping funnel, was added 4.1 g. (0.03 mole) of 2-amino-4,5,6,7-tetrahydrobenzoxazole, and 10 ml. of pyridine. To this solution was added dropwise with stirring over 10 minutes 4.3 g. (0.033 mole) of propionic anhydride. A temperature rise from 25°C. to 30°C. occurred after which the reaction mixture was heated to 50° for 30 minutes, cooled, and the solution poured into 50 ml. of cold water. A yellow oil formed which was decanted from the aqueous phase, dissolved in 200 ml. of ether and the ether solution washed once with 50 ml. of water and dried over sodium sulfate. Removal of the ether on a rotary concentrator yielded 1.7 g. of crude product as a yellow solid. On standing the aqueous solution precipitated an additional 1.8 g. of product as colorless plates, m.p. 119°–120°. The structure of the compound was determined by N.M.R. spectroscopy.

Calculated for $C_{10}H_{14}N_2O_2$: C, 61.9; H, 7.23; N, 14.4

Found: C, 61,3; H, 7.35; N, 14.2

A number of the type of compounds prepared in the preceding examples, together with their elemental analysis and melting points, are shown below in Table I.

TABLE I

Additional derivatives of 2-amino-4,5,6,7-tetrahydrobenzothiazoles

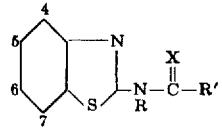

| Ring substitution | R | R' | X | Prepared as in Example | M.P., °C. | Calcd. C | Calcd. H | Calcd. N | Found C | Found H | Found N |
|---|---|---|---|---|---|---|---|---|---|---|---|
| 5,5,7-trimethyl-7-cyano | H | $C_2H_5$ | O | 2 | 150–153 | 60.7 | 6.85 | 15.15 | 60.98 | 7.29 | 15.26 |
| 5,5,7-trimethyl-7-cyano | H | $NHCH_3$ | O | 4 | 190–195 | 56.1 | 6.47 | 20.15 | 55.2 | 6.9 | 20.29 |
| 6-butoxy | H | $C_2H_5$ | O | 2 | 79–84 | 59.6 | 7.81 | 9.94 | 59.29 | 7.76 | 10.31 |
| 5,7-dimethyl | H | $C_2H_5$ | O | 2 | 168 | 60.5 | 7.66 | 11.77 | 60.96 | 7.80 | 11.77 |
| 5,5,7,7-tetramethyl | H | $NHCH_3$ | O | 4 | 331 | 58.4 | 7.88 | 15.7 | 58.49 | 7.89 | 15.75 |
| 5,5,7-trimethyl | H | H | O | | 194–197 | 59.0 | 7.15 | 12.5 | 59.5 | 7.63 | 12.59 |
| 6-methyl | H | $C_2H_5$ | O | 2 | 174–177 | 59.0 | 7.15 | 12.5 | 58.87 | 7.23 | 12.61 |
| 5,5,7-trimethyl | H | $CH_2Cl$ | O | | 151–152 | 52.8 | 6.25 | 10.3 | 52.64 | 6.44 | 9.68 |
| 5,5,7-trimethyl | $CH_3$ | $CH_2Cl$ | O | | 106 | 54.5 | 6.63 | 9.77 | 54.87 | 6.77 | 9.92 |
| 5,5,7-trimethyl | $CH_3$ | $N(CH_3)_2$ | O | 14 | 117 | | | 14.95 | | | 15.10 |
| 5,5,7-trimethyl | $C_2H_5$ | $NHCH_3$ | O | 4 | 153–156 | 59.8 | 8.20 | 14.95 | 59.68 | 8.17 | 15.32 |
| | $CH_3$ | $NHCH_3$ | O | 4 | 196.5–198.5 | 53.4 | 6.68 | 18.65 | 53.2 | 6.81 | 18.38 |
| | $CH_3$ | $C_2H_5$ | O | 2 | | 59.0 | 7.15 | 12.50 | 58.94 | 7.48 | 12.56 |
| 5,7,7-trimethyl-7-carbomethoxy | H | $C_2H_5$ | O | 2 | | | | 8.55 | | | 9.0 |
| 5,5,7-trimethyl-7-cyano | H | $N(CH_3)_2$ | O | 14 | 171–172 | 55.4 | 6.85 | 19.19 | 55.49 | 5.8 | 18.18 |
| 5,5,7-trimethyl-6,7-dehydro | H | $C_2H_5$ | O | 2 | ¹134–136 | 62.4 | 7.2 | 11.2 | 62.42 | 7.25 | 11.16 |
| 6-thia | H | $C_2H_5$ | O | 2 | ¹169 | 47.5 | 5.26 | 12.3 | 48.4 | 5.83 | 12.55 |

¹ Decomposed.

EXAMPLE 16

Representative thiazole derivatives from those prepared in the previous examples were evaluated for post-emergence herbicidal activity in this example. The test procedure employed was as follows:

Two flats, seeded with six crops (cotton, soybean, tomato, corn, rice and oats) and six weeds (mustard, morning glory, velvet leaf, crabgrass, Johnson grass and foxtail), were sprayed with a formulation containing the test chemical and acetone as solvent at a rate equivalent to 10 lbs./acre. The flats were then held in the greenhouse and a response rated after 12-16 days. Response was rated by a scale of 0-10. The 0-10 scale is defined as follows:

0 — no injury; 1-3 = slight injury; 4-6 = moderate injury, plants may die; 7-9 = severe injury, plants will probably die; and 10 = all plants dead (complete kill). The standard used was N-[3,4-Dichlorophenyl]-N',N'-dimethylurea at 1.25 lbs./acre.

These tests were then run at a rate of 1.25 lbs./acre in accordance with the previous test procedure. The test results are shown in Table II.

TABLE II

| Compound | Dosage rate, lb./acre | Corn | Soybean | Cotton | Rice | Morning Glory | Tomato | Oats | Crabgrass | Johnson grass | Yellow Foxtail | Velvet Leaf | Mustard |
|---|---|---|---|---|---|---|---|---|---|---|---|---|---|
| 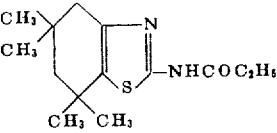 | 2.5<br>0.6 | 3<br>0 | 10<br>6 | 5<br>3 | 3<br>3 | 10<br>10 | 10<br>8 | 10<br>3 | 10<br>5 | 8<br>3 | 9<br>1 | 9<br>9 | 10<br>5 |
| 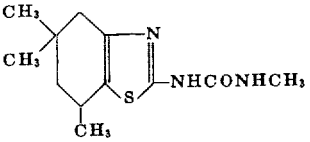 | 5<br>1.25 | 1<br>1 | 5<br>2 | 10<br>5 | 5<br>5 | 3<br>2 | 10<br>10 | 1<br>1 | 3<br>3 | 2<br>3 | 3<br>2 | 8<br>1 | 10<br>1 |
| 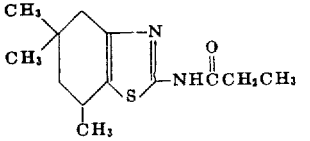 | 10 | 10 | 10 | 10 | 6 | 10 | 10 | 10 | 9 | 7 | 9 | 8 | 10 |
| 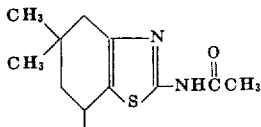 | 10 | 5 | 10 | 8 | 8 | 10 | 10 | 9 | 10 | 10 | 9 | 9 | 10 |
| 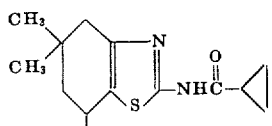 | 10 | 10 | 10 | 10 | 6 | 10 | 10 | 10 | 9 | 8 | 7 | 7 | 10 |
| 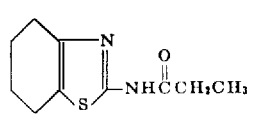 | 10 | 8 | 10 | 10 | ........ | 10 | 10 | 8 | 10 | 6 | 6 | ........ | 8 |
| 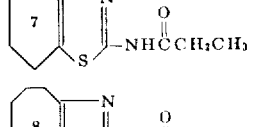 | 10 | 10 | 10 | 10 | 9 | 10 | 10 | 10 | 10 | 5 | 10 | 5 | 10 |
| 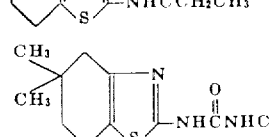 | 10 | 6 | 5 | 6 | 5 | 5 | 9 | 9 | 10 | 4 | 7 | 3 | 7 |
| 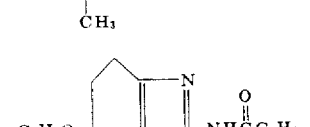 | 5 | 1 | 5 | 10 | 5 | 3 | 10 | 1 | 3 | 2 | 3 | 8 | 10 |
|  | 10 | 4 | 2 | 5 | 2 | 9 | 7 | 9 | 10 | 10 | 9 | 8 | 10 |

TABLE II—Continued

| Compound | Dosage rate, lb./acre | Corn | Soybean | Cotton | Rice | Morning Glory | Tomato | Oats | Crabgrass | Johnson grass | Yellow Foxtail | Velvet Leaf | Mustard |
|---|---|---|---|---|---|---|---|---|---|---|---|---|---|
| 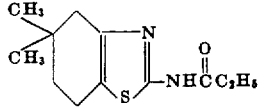 | 5 | 7 | 7 | 9 | 6 | 10 | 9 | 10 | 8 | 8 | 9 | 8 | 10 |
| 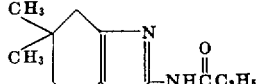 | 10 | 7 | 9 | 10 | 2 | 10 | 10 | 10 | 10 | 10 | 10 | 10 | 10 |
| 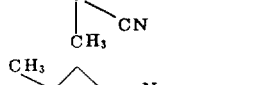 | 10 | 9 | 9 | 8 | 3 | 10 | 10 | 10 | 10 | 10 | 10 | 10 | 10 |
| 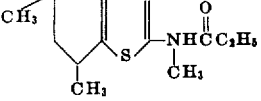 | 10 | 7 | 9 | 9 | 7 | 10 | 9 | 2 | 9 | 10 | 8 | 6 | 9 |
| 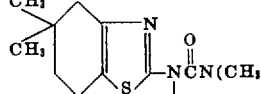 | 10 | 3 | 5 | 10 | 2 | 9 | 10 | 2 | 7 | 5 | 5 | 10 | 10 |
| 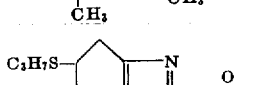 | 10 | 10 | 9 | 9 | 5 | 10 | 10 | 10 | 10 | 10 | 10 | 10 | 10 |
| 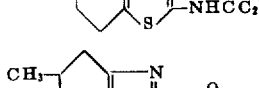 | 10 | 9 | 10 | 10 | 7 | 10 | 10 | 9 | 10 | 9 | 10 | 10 | 10 |
| 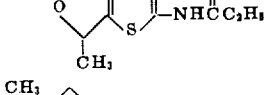 | 10 | 9 | 10 | 10 | 9 | 10 | 10 | 10 | 10 | 10 | 10 | 10 | 10 |
| 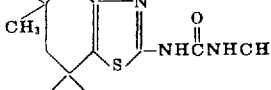 | 2.5 | 2 | 4 | 7 | 2 | 2 | 8 | 0 | 3 | 2 | 3 | 9 | 5 |
| 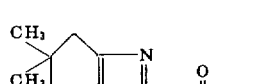 | 10 | | | | | 2 | | | 10 | 6 | 9 | 6 | 7 |

The following examples, Examples 16 and 17, illustrate typical pesticidal compositions or formulations of this invention. Parts are by weight.

EXAMPLE 17

A wettable powder concentrate that is diluted to the desired concentration by dispersing it in water has the following composition:

| | Parts |
|---|---|
| Active ingredient | 50 |
| Solid Carrier (e.g. attapulgite) | 42 |
| Dispersant (monocalcium salt of polymeric alkylaryl sulfonic acid) | 4 |
| Wetting Agent (Sodium Alkyl Naphthalene Sulfate (Nekal BA-75'4 | |

EXAMPLE 18

A liquid concentrate that is diluted in the field with a solvent such as kerosene has the following composition.

| Active Ingredient | Parts |
|---|---|
| Xylene | 10 |
|  | 90 |

It should be understood from the foregoing that the above description is merely illustrative of the preferred embodiments and specific examples of the present invention and that in all of which embodiments and examples, variations, such as, e.g., those previously described, can be made by those skilled in the art without departing from the spirit and purview thereof, the invention being defined by the following claims.

What is claimed is:

1. A compound of the formula

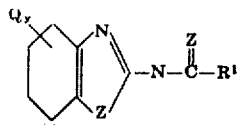

wherein Q is $C_1$ to $C_{10}$ alkyl, $C_1$ to $C_2$ alkoxy, $C_1$ to $C_3$ alkylthio, or cyano; Y is an integer from 1 to 4; the Z within the ring is sulfur and the Z outside the ring is oxygen; R is hydrogen, methyl or ethyl; and R' is hydrogen, $C_1$ to $C_{10}$ alkyl, $C_3$ to $C_6$ cycloalkyl, $C_1$ to $C_3$ alkoxy, $C_1$ or $C_2$ halogenated alkyl, methylamino or dimethylamino.

2. Compounds as claimed in claim 1 in which Q is methyl or cyano; Y is an integer from 2 to 4; and R' is methyl or ethyl.

3. A compound of the formula

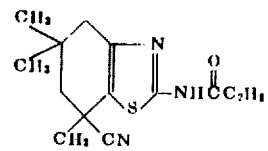

4. A compound of the formula

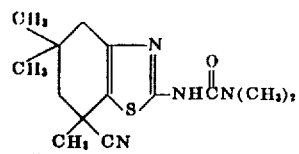

5. A compound of the formula

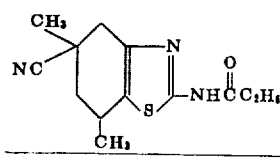

* * * * *